No. 666,847. Patented Jan. 29, 1901.
C. S. EMMERT.
DEVICE FOR APPLYING LIQUID DRESSING.
(Application filed Oct. 18, 1900.)

(No Model.)

Witnesses:-
Carl H. Crawford
William L. Hall

Inventor:-
Charles S. Emmert,
by Poole & Brown
his Attorneys form a part of this specification.

UNITED STATES PATENT OFFICE.

CHARLES S. EMMERT, OF CHICAGO, ILLINOIS.

DEVICE FOR APPLYING LIQUID DRESSING.

SPECIFICATION forming part of Letters Patent No. 666,847, dated January 29, 1901.

Application filed October 18, 1900. Serial No. 33,436. (No model.)

*To all whom it may concern:*

Be it known that I, CHARLES S. EMMERT, of Chicago, in the county of Cook and State of Illinois, have invented certain new and useful Improvements in Devices for Applying Liquid Dressing; and I do hereby declare that the following is a full, clear, and exact description thereof, reference being had to the accompanying drawings, and to the letters of reference marked thereon, which form a part of this specification.

This invention relates to improvements in daubing devices used to apply liquid dressing to boots and shoes or other surfaces which it is desired to polish, oil, or the like, and comprises generally a wire shank or handle formed at one end to provide a loop to engage and hold a mass of compressible material of suitable shape and size to form the dauber, the whole being commonly attached to a cork or stopper of a bottle designed to contain the dressing.

The invention relates, specifically, to an improved construction designed to effectively retain the dauber engaged with the shank or handle during the life of the device, to prevent the sharpened extremity of the loop from coming in contact with the surface being polished, and to facilitate the placing of the dauber on the shank or handle in the manufacture of the device.

To these ends my invention consists in the matters hereinafter set forth, and more particularly pointed out in the appended claim.

Figure 1:
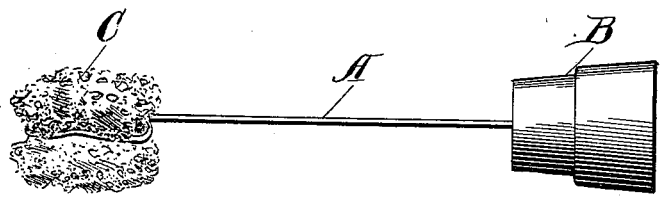
Figure 2:
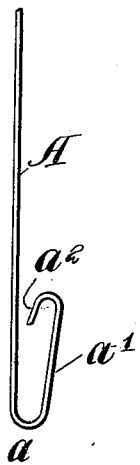
Figure 3:
Figure 4:
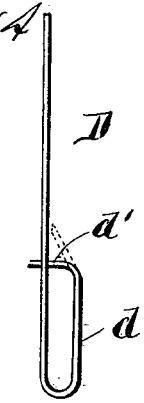

In the drawings, Figure 1 is a side elevation of a daubing device made in accordance with my invention. Fig. 2 shows the looped end of the shank after being formed preparatory to receiving the dauber. Fig. 3 is a similar view showing the completed loop in the position it occupies when the dauber is attached to the shank. Fig. 4 illustrates the looped end of the shank of a daubing device as heretofore constructed.

As shown in the drawings, A indicates the shank or handle of the device; B, the stopper, to which the shank is usually attached by being inserted at one end thereinto, and C the dauber, of a suitable compressible absorbent material, such as sponge or the like, attached to the opposite end of the shank. As a means of attaching the dauber to the shank said latter is formed at its end to provide an oblong loop $a$, one side or member of which is formed by the straight shank A and the other side or member of which is formed by a part $a'$ of the shank bent back or folded upon itself in a direction generally parallel with the shank and between which the dauber C is confined. The extreme end $a^2$ of the folded portion of the loop is reversely turned to direct the same toward the interior of the loop. Said reversely-turned extremity of the loop is generally parallel with the shank, and when the loop is closed, as shown in Fig. 3, it lies against the straight part of the shank and closes the upper end of the loop, thereby effectually preventing the dauber from moving upwardly on the shank and being disengaged from the loop. In the preferred form of the device the part $a^2$ engages the inner surface of the shank. The compressible dauber is made of such thickness with respect to the width of the loop that when the dauber is placed in the loop and the loop closed thereover the members of the loop are deeply embedded in the dauber, as shown in Fig. 1, and do not come in contact with the surface to which the dressing is applied by the device. Desirably the backturned portion $a'$ will be bent inwardly between the ends of the loop, as shown in Fig. 3, and serve to confine more closely the dauber. This feature is also advantageous when the reversely-turned portion engages the inner side of the shank, as said parts will be held more closely together. Both of the side members or either one thereof may be curved inwardly.

In the manufacture of the device the loop is partially formed on the end of a straight piece of wire in the manner shown in Fig. 2. As therein shown, the backwardly-folded part or member $a'$ of said loop stands at a divergent angle to the shank A, while the reversely-turned extremity is bent at an acute angle with respect to the part $a'$ and projects into the open loop. The loop at this time is therefore sufficiently open to permit the compressible dauber to be slipped into the loop between the shank and the extremity $a^2$, and said reversely-turned extremity temporarily prevents said dauber from slipping backwardly on the shank before the loop is closed and from becoming disengaged from the loop.

After said dauber has been placed in the loop in the manner described the loop is closed in the manner shown in Fig. 3. In practice the shanks having open loops, as shown in Fig. 2, are made in quantities, preferably by a suitable machine, and the daubers are thereafter slipped into place thereon until a large number of shanks are thus fitted with daubers, after which the loops are closed by a suitable compressing device. The reversely-turned extremities of the loop not only temporarily prevent detachment of the compressible daubers from the partially-formed loops, but also engage said daubers in such manner as to hold the same properly in place during the closing of the loop, thereby avoiding the necessity of giving attention to this detail and greatly facilitating the work.

Daubing devices of this character as heretofore constructed have been provided with looped shanks of the form shown in Fig. 4, consisting of a straight shank portion D, forming one side of the loop, a rearwardly-folded part or member $d$, generally parallel with the shank and forming the other side of the loop, and an extremity $d'$, bent substantially at a right angle to the part $d$ and passing across and closing the upper end of the loop. In order to insure the complete closure of the upper end of the loop, it has been the practice to carry the extreme end of the part $d'$ past the shank D. One of the great objections to this form of device is that the projecting extremity of the loop, which is sharp and jagged, comes in contact with the surface to which the dressing is being applied, with the result of scratching said surface. In order to avoid this difficulty, it is the general practice of users to bend the extremity $d'$ upwardly, as shown in dotted lines, to prevent the same projecting past the shank. By reason of the stiffness of the wire the bending up of the extremity $d'$ in the manner stated almost invariably causes such a distortion of the loop as to render it unfit for the proper retention of the dauber. In many instances after such change has been made the extremity $d'$ does not effectually close the loop and permits the dauber to slide up the shank out of engagement with the loop. The turning of the extremity $a^2$ of the device embodying my invention toward the loop effectually overcomes the difficulties above mentioned, as the sharp extremity of the wire forming the loop is located entirely inside the loop and cannot come into contact with surfaces to which the dressing is being applied. The loop being permanently closed upon the compressible dauber and no reason existing for disturbing the same, all liability of the dauber getting out of proper relation to the loop or becoming disengaged therefrom is effectually avoided. Further, as above stated, the inturned extremity $a^2$ of the loop performs an important function in temporarily holding the dauber in the incomplete loop during its manufacture, so that said dauber having once been properly placed within the loop does not require further attention to adjust the same or hold it in position until and during the time pressure is applied to close the loop.

I claim as my invention—

A daubing device comprising a shank bent upon itself to form a loop, and a compressible absorbent dauber confined in said loop, the extremity of the folded portion of the shank being reversely turned to project it toward the interior of the loop to close the same, and one side member of the loop being bent inwardly between the ends of the loop.

In testimony that I claim the foregoing as my invention I affix my signature, in presence of two witnesses, this 16th day of October, A. D. 1900.

CHARLES S. EMMERT.

Witnesses:
TAYLOR E. BROWN,
GERTRUDE BRYCE.